June 22, 1965   J. B. THOMSON ETAL   3,190,703
BEARING STRUCTURE
Filed June 25, 1962
2 Sheets-Sheet 1
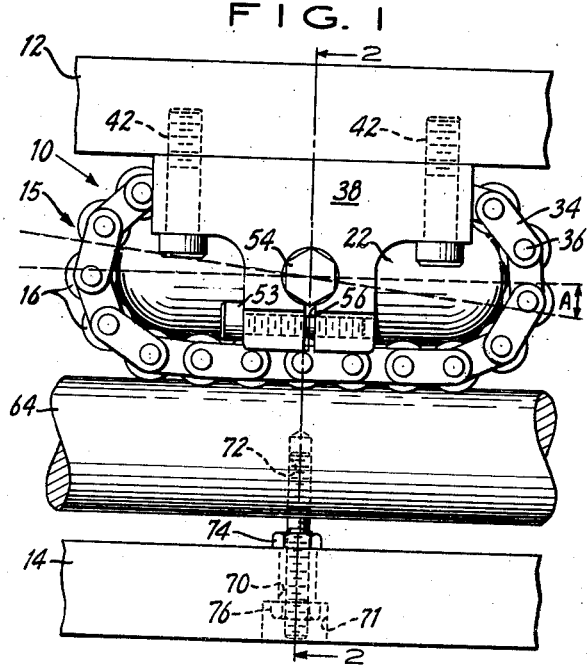
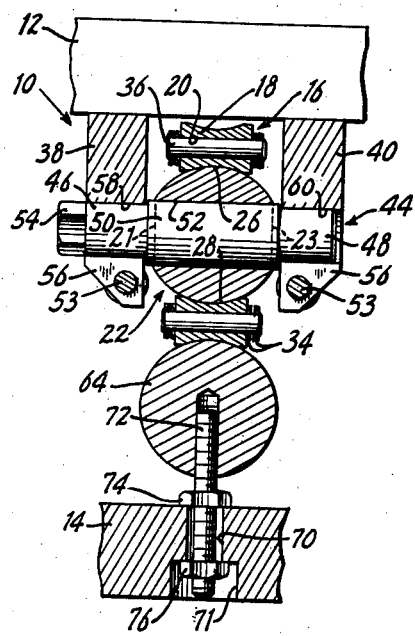
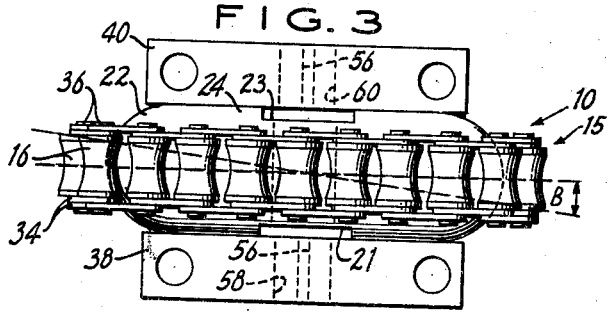
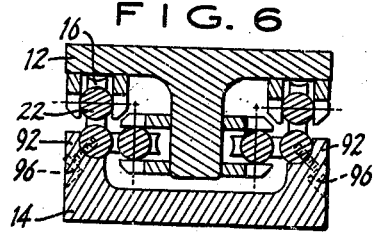
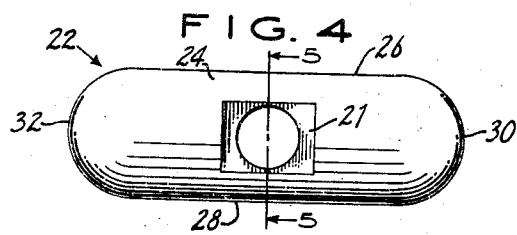
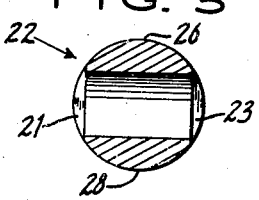
INVENTORS
JOHN B. THOMSON
ROBERT C. MAGEE
BY
Morgan, Finnegan, Durham & Pine
ATTORNEYS

United States Patent Office 3,190,703
Patented June 22, 1965

3,190,703
BEARING STRUCTURE
John B. Thomson, 1029 Plandome Road, Manhasset, and Robert C. Magee, Manhasset, N.Y.; said Magee assignor to said Thomson
Filed June 25, 1962, Ser. No. 204,971
1 Claim. (Cl. 308—6)

This invention relates to linear roller bearings of the recirculating type which are frequently used in place of plain sliding ways in machine tools, special machinery and other devices. They are employed to provide very low friction and avoid the stick slip and chatter which is a common disadvantage of plain V or flat ways.

Roller bearings of this type heretofore have been used on flat or V ways which are expensive to fabricate and the bearing units themselves are expensive to fabricate and difficult to install.

One of the objects of this invention is to provide a recirculating linear roller bearing unit of this type which can be manufactured inexpensively to great precision and to be used in combination with a round way which likewise can be manufactured with great precision very economically.

Another object of the invention is to provide a bearing structure having a greater load capacity.

Another object of the invention is to provide a bearing structure which is easy and inexpensive to install and which can be readily serviced and replaced in the field.

Another object of the invention is to provide a bearing unit and way structure which can be mounted for accurate traverse over an uneven base, thus eliminating the need for costly precision machining of the base surface.

Another object of the invention is to provide a bearing structure with a double wear surface to greatly extend the life of the unit.

Another object of this invention is to eliminate catchiness found in bearings of this type under certain operating conditions.

Another object of the invention is to provide a bearing structure where the rollers do not wear as a result of rubbing against each other or skewing from their proper axis.

Other objects and advantages of the invention will be obvious herefrom, or may be learned by practice with the invention, the same being realized and attained by means of the instrumentalities and combinations pointed out in the appended claim.

The foregoing general description and the following detailed description are exemplary and explanatory but are not restrictive of the invention.

Of the drawings illustrating, by way of example, a preferred embodiment of the invention:

FIG. 1 is a side elevation of the preferred embodiment of the present invention in operative load-supporting position.

FIG. 2 is a sectional view taken along line 2—2, FIG. 1.

FIG. 3 is a plan view of the bearing structure of the present invention.

FIG. 4 is a side elevation of the bearing race of the present invention.

FIG. 5 is a sectional view taken along line 5—5 of the bearing race shown in FIG. 4.

FIGS. 6–8 are sectional views illustrating typical mounting arrangements of the bearing structure of the present invention.

Figure 7:
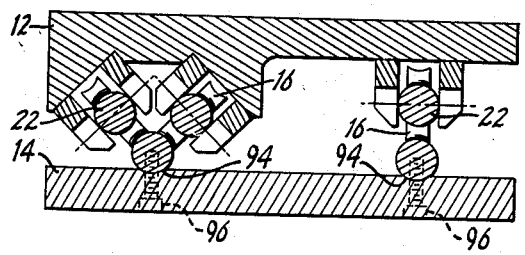

Referring to the drawings, and especially FIGS. 1–3, there is illustrated the preferred embodiment of the present invention which comprises a bearing structure, designated generally 10, disposed in operative position between a load-carrying member 12 and a base element 14. In a typical application of the present invention, member 12 may include the travelling table or carriage of a conventional grinding or milling machine and element 14 the bed of such machine.

Bearing structure 10 comprises a bearing chain 15 including a plurality of bearing rollers 16. Rollers 16 are formed with a body section 18 of concave axial cross-section, as shown in FIG. 2, and each roller 16 is also provided with an axial recess 20 for the pin which engages the connecting links.

Chain 15 with rollers 16 is adapted for travel around bearing race 22. Bearing race 22 is formed with a cylindrical body section 24 to provide accurate roller-contacting upper and lower runs 26 and 28, while the end sections 30 and 32 are spheroidal.

It will be understood that the radius of curvature of the concave body section 18 of rollers 16 is preferably equal or less than the radius of curvature of the roller-contacting portions of race 22 to prevent excessive roller skew as they travel therearound.

To maintain rollers 16 in predetermined spaced relationship around race 22, and further prevent skewing of the rollers 16 as they travel around race 22, adjacent rollers 16 are interconnected by means of retainer links 34 to form a roller chain 15. To facilitate repair or replacement of bearing components in the field, one or more links 34 may be formed of stretchable or yieldable material; such as, nylon or rubber.

To secure the bearing structure 10 to load-carrying member 12, there is provided side mounting plates 38 and 40 disposed on each side of race 22 as shown best in FIG. 2. Side plates 38 and 40 are each secured as by bolts 42 to member 12. Further plates 38 and 40 are connected to race 22 by an eccentric trunnion pin 44. Pin 44 is rotatably supported at each end 46 and 48 in plates 38 and 40, respectively, with body section 50 of pin 44 adapted to be received in a cooperating opening 52 formed in race 22. To facilitate forming of opening 52, race 22 adjacent its mid-section is provided with flat outer surfaces 21 and 23 on each side thereof, as shown best in FIGS. 3 and 4.

Figure 9:
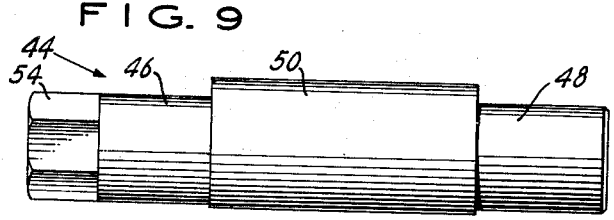
FIG. 9 is a detailed view of one form of the eccentric trunnion pin.
Figure 10:
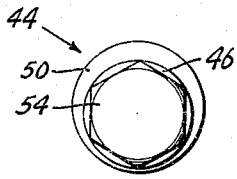
FIG. 10 is an end view of the pin illustrated in FIG. 9.

As will be noted best in FIGS. 9 and 10, pin 44 is asymmetrical with body 50 thereof, slightly offset from end sections 46 and 48. Thus, suitable rotation of head 54 of pin 44 effects a raising or lowering of structure 10 when pin 44 is located in race 22. This provides height adjustment for the bearing assembly.

Each side plate 38 and 40 is also provided with a slot 56 adjacent the recesses 58 and 60 formed respectively therein which accommodates its associated end 46 and 48 of pin 44. A locking bolt 52 is disposed across each slot 56 and is adapted, upon actuation, to close its associated slot 56, effecting frictional engagement of plates 38 and 40 and pin 44, thereby preventing inadvertent rotation of pin 44 and alteration of the height adjustment of the bearing assembly.

It will be understood that body section 50 of pin 44 effects a cam-like action on race 22, moving race 22 up or down relative to table 12, as desired.

To transfer the load from member 12 to base 14, there is provided a bearing or support shaft 64 along which unit 10 travels with member 12. This shaft constitutes a round way. Shaft 64 is preferably circular in cross-section and formed with a radius of curvature, in the preferred embodiment, equal to the radius of curvature of the roller-contacting surfaces 26, 28, 30 and 32 of bearing race 22. By forming rollers 16 with a radius of curvature equal to or smaller than the radii of curvature of race 22 and shaft 64, excessive roller skew is prevented as roller chain 15 travels around race 22 and along shaft 64.

Securing shaft 64 to bed 14 is a series of threaded stud shafts 72, each of which is positioned in bore 70 and threaded into shaft 64, as shown best in FIGS. 1 and 2. Bores 70 are preferably of a slightly larger diameter than shafts 72 to permit a degree of lateral adjustment in the location of shaft 64.

The height of shaft 64 can be adjusted along its length by rotation of nut 74 on top of base 14 and nut 76 located in the counterbore 71.

Thus, even in the event base 14 is uneven, accurate alignment of support shaft 64 and bearing unit 10 can be accomplished providing accuracy which is essential in precision machines.

It will be understood that the transfer of load from member 12 to shaft 64 and base 14 through bearing structure 10 occurs during the bearing run along section 28 of race 22 or in the lower stretch of chain 15, as viewed in FIG. 2. When, through use, section 28 becomes worn, race 22 need only be inverted to provide a new cylindrical surface for the lower stretch of chain 15.

Figure 11:
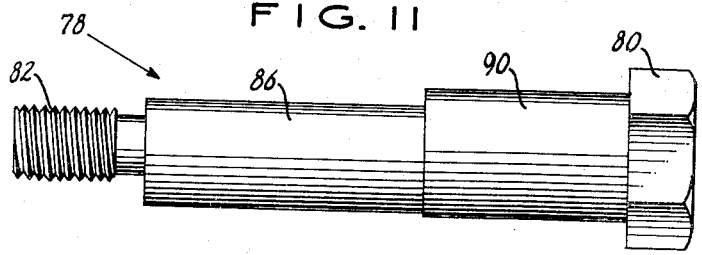
FIG. 11 is a modified form of the eccentric trunnion pin of FIG. 9 embodying a cantilevered construction.
Figure 12:
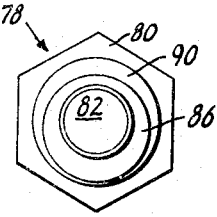
FIG. 12 is an end view of the pin illustrated in FIG. 11.

FIGS. 11 and 12 disclose an alternative method of mounting race 22 to member 12, which eliminates the need for side plates 38 and 40. This embodiment is preferably employed when member 12 is provided with depending legs 13, as shown in FIG. 8.

Trunnion pin 78 is provided at one end with an actuating head 80. The opposite end 82 of pin 78 is threaded to receive a lock nut 84. Offset section 86 of pin 78 is adapted to be rotatably received in a suitable opening 88 in its associated leg 13 of member 12, while section 90 of pin 78 is accommodated in bore 52 in race 22.

Rotation of head 80 rotates pin 78 raising or lowering bearing unit 10, as in the preferred embodiment. When in desired adjusted position, lock nut 84 is actuated to secure unit 10 in such adjusted position.

Figure 8:
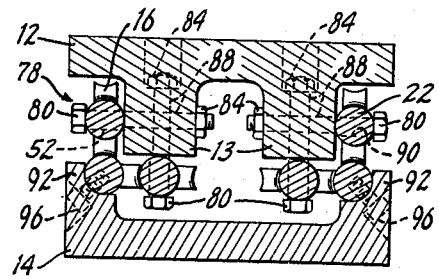

As shown in FIGS. 6–8, there is illustrated several typical mounting arrangements for unit 10. In certain of such arrangements, as shown in FIGS. 6 and 8, support posts 72 may be eliminated and replaced by suitable ledges 92 formed on base 14. In another arrangement shown in FIG. 7 support posts 72 are replaced by grooves 94 formed in the surface of base 14 and the shaft is secured in place by bolts 96.

The advantages of the bearing structure and shaft combination heretofore described are numerous. The precision of the bearing unit itself is governed by the rollers 16, which can be accurately ground by conventional means, and the race 22. As the ends of the race, 30 and 32, do not have to carry load they do not have to be formed to great accuracy. The race and these ends can be rapidly machined on automatic screw machines from bar stock. After heat treatment the outer cylindrical surface of the race can be finished on high production precision grinding equipment to the required accuracy.

Flat or V ways which are used with previous linear roller bearing units are extremely expensive to manufacture. As they cannot be through-fed on a centerless grinder, tremendous reciprocating surface grinders must be employed to slowly grind them to the necessary dimensional limits and surface finish. In sharp contrast, the round ways in this invention are formed by feeding induction case hardened steel bars through standard centerless grinding machines at high speed. When necessary, subsequent machining operations can easily be done with carbide tools or with local annealing.

The bearing units in this invention have a greater load capacity than the conventional flat way units for two reasons. First, the bearing race and rollers are free to pivot around the trunnion pin on which they are mounted as indicated by angle A in FIG. 1. This assures even load distribution over all of the rollers in bearing contact and precludes excessive loading on one end or the other which is almost a certainty with conventional flat way bearing unit since it is virtually impossible to assure mounting the unit in perfect parallelism with the base.

Additionally, the curved roller and round face and way combination gives a greater length of line contact for each roller than the equivalent size straight cylindrical roller.

The bearing units in this invention are much easier to initially install and much more readily serviced and replaced when necessary. Since a large table or carriage on a machine tool is seldom, if ever, dead flat due to machining inaccuracies or subsequent warpage, the adjustable height feature permits simple and rapid compensation for this variation. In conventional flat way units it is frequently necessary to employ tedious and time consuming shimming operations to compensate for the lack of accuracy in the supported member. Moreover, due to the rounded ends of the race and curved roller combination it is not absolutely essential to mount the bearing unit exactly parallel to the line of travel. Small amounts of this type of misalignment can be accommodated by the chain of rollers running slightly off the center line as illustrated by angle B in FIG. 3. It should be appreciated that these margins for error are equally important to the man in the field who is doing service work on the machine or replacing bearings.

Another unique feature of this invention provides a double wear surface which greatly extends the life of bearing units of this general type whether they are used on round or flat ways. When the load carrying surface becomes excessively worn, all that is necessary is to invert the race unit to provide a new bearing surface for continued operation. This cannot be done with the previous flat way units which must be discarded after the bearing surface is worn.

The bearing structure in this invention also minimizes wear on the rollers due to the fact that the radius of the curvature of the rollers is equal or slightly less than the curved surface on which they bear. There is a self-aligning tendency which brings the axis of the rollers perpendicular to their line of travel and automatically corrects any skewing or cramping action. Additionally, the rollers in the preferred form are not pushed around the recirculation circuit so they do not rub against each other causing wear.

Another important feature of this bearing structure is the fact that some of the connecting links in the roller chain can be made of stretchable material which enables the chain of rollers to be simply snapped over the rounded ends of the race for simple an easy field removal and replacement.

In a circuit of rollers circulating around an oval race member, the length of the circuit must vary slightly due to the geometry of the rollers and their oval path. This is true when the rollers and ways are curved as well as when the rollers are straight cylindrical and the ways flat. Unless sufficient excess length is provided in the roller chain arrangement, the intermittent length of circuit variation will cause a catchiness in operation. When the rollers are otherwise retained and guided and push each other around the circuit, this catchiness occurs when all of the clearance between the rollers is on the bearing surface between two loaded rollers, leaving none in the remainder of the circuit. Resilient links in the roller chain arrangement allow for the length variations and eliminate the catchiness and in other arrangements a resilient roller, spring, or other member, can be inserted between some of the rollers to solve the problem.

Bearings of this general type are most frequently used in a horizontal plane, hence, they have been so illustrated and described. Obviously, they can be used for vertical or travel in any other plane. Also, while the cylindrical race and roller chain are the preferred form illustrated and described, there are many other embodiments included within the scope of this invention.

We claim:

A recirculating anti-friction roller bearing unit for linear motion to be mounted on a member and to bear against a round way, said member and round way being relatively linearly movable with respect to each other and comprising in combination, a recirculating circuit of concave rollers, a race member with an elongated rounded bearing surface, said circuit being endless and movable about said race member to bring said rollers alternately into bearing contact and out of bearing contact between the opposing surfaces of the rounded race member and the round way when the unit is mounted to bear against a round way, a mounting member on which said race member is rockably mounted, whereby the load is distributed over all of the rollers in contact with the race member and round way, said concave rollers being free to move circumferentially as well as roll longitudinally with respect to the race way, and said concave rollers being guided along the bearing surface of the race member by interaction of the concave rollers and the round way, said interaction tending to produce self-alinement and to reduce skewing of the concave rollers.

References Cited by the Examiner

UNITED STATES PATENTS

| | | |
|---|---|---|
| 2,230,442 | 2/41 | Arms. |
| 2,519,101 | 8/50 | Bardet _____ 308—6 |
| 2,589,887 | 3/52 | Sprague _____ 74—245 |
| 2,664,970 | 1/54 | Warshaw. |
| 2,672,379 | 3/54 | McVey. |
| 2,723,886 | 11/55 | Warshaw. |
| 2,977,164 | 3/61 | Witte _____ 308—217 |

FOREIGN PATENTS

| | | |
|---|---|---|
| 556,746 | 10/43 | Great Britain. |
| 756,305 | 9/56 | Great Britain. |
| 761,699 | 11/56 | Great Britain. |
| 1,231,348 | 9/60 | France. |

ROBERT C. RIORDON, *Primary Examiner.*

FRANK SUSKO, *Examiner.*